(12) United States Patent
Rowley et al.

(10) Patent No.: US 7,460,735 B1
(45) Date of Patent: Dec. 2, 2008

(54) SYSTEMS AND METHODS FOR USING IMAGE DUPLICATES TO ASSIGN LABELS TO IMAGES

(75) Inventors: Henry A. Rowley, Mountain View, CA (US); Shumeet Baluja, Mountain View, CA (US); Arungundram C. Narendran, Sammamish, WA (US)

(73) Assignee: Google Inc., Mountain View, CA (US)

( * ) Notice: Subject to any disclaimer, the term of this patent is extended or adjusted under 35 U.S.C. 154(b) by 842 days.

(21) Appl. No.: 10/950,696

(22) Filed: Sep. 28, 2004

(51) Int. Cl.
*G06K 9/54* (2006.01)
*G06K 7/00* (2006.01)
(52) U.S. Cl. .................... 382/305; 707/104.1
(58) Field of Classification Search ......... 382/162, 382/168, 180, 190, 209, 219, 228, 274, 305, 382/312
See application file for complete search history.

(56) References Cited

U.S. PATENT DOCUMENTS

| | | | | |
|---|---|---|---|---|
| 5,687,252 A | * | 11/1997 | Kanno et al. ............ | 382/176 |
| 6,594,383 B1 | * | 7/2003 | Syeda-Mahmood ......... | 382/162 |
| 6,804,684 B2 | * | 10/2004 | Stubler et al. ............ | 707/104.1 |
| 6,826,305 B2 | * | 11/2004 | Zhu ......................... | 382/172 |
| 7,319,699 B1 | * | 1/2008 | Provine et al. ........... | 370/395.3 |

OTHER PUBLICATIONS

Charles E. Jacobs et al.; "Fast Multiresolution Image Querying", Proceedings of SIGGRAPH 95; Aug. 6-11, 1995; 11 pages.

* cited by examiner

*Primary Examiner*—Kanji Patel
(74) *Attorney, Agent, or Firm*—Harrity & Harrity, LLP (57) ABSTRACT

A system analyzes multiple images to identify similar images using histograms, image intensities, edge detectors, or wavelets. The system retrieves labels assigned to the identified similar images and selectively concatenates the extracted labels. The system assigns the concatenated labels to each of the identified similar images and uses the concatenated labels when performing a keyword search of the plurality of images.

33 Claims, 5 Drawing Sheets

SYSTEMS AND METHODS FOR USING IMAGE DUPLICATES TO ASSIGN LABELS TO IMAGES

BACKGROUND

1. Field of the Invention

Systems and methods consistent with the principles of the invention relate generally to information searching and, more particularly, to using image duplicates to assign labels to images for use in image searching.

2. Description of Related Art

Existing information searching systems use search queries to search data to retrieve specific information that corresponds to the received search queries. Such information searching systems may search information stored locally, or in distributed locations. The World Wide Web ("web") is one example of information stored in distributed locations. The web contains a vast amount of information, but locating a desired portion of that information can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user.

Documents that include digital images may be searched using existing search engine technology. Existing search engines employ keyword searching to select which images to return as search results based on labels associated with the images. For example, if a user queries on "cars," the search engine searches a corpus of image documents for images that have the label "cars" associated with them. This label may have been automatically assigned to the image by looking at the surrounding text from the document on which the image is located. For example, the following surrounding text may be used to assign labels to an image: 1) the filename of the image; 2) the anchor text associated with the image; 3) the caption associated with the image; and 4) document title.

Unfortunately, labels assigned using such surrounding text may be incomplete since only a small portion of the surrounding text may be relevant to the image, and since different documents may focus on different parts of the image when describing it. For example, multiple news articles might each contain a copy of a picture of a company's headquarters, but with different captions, like "headquarters," "corporate campus," "IPO," "stock dividends," or "earnings report." All of these words are associated in some way with the image of the corporate headquarters, but each is associated with only one copy of the image. This can lead to less than ideal image searching, because ideally it would be desirable to associate all of the words with each of the duplicate images.

SUMMARY OF THE INVENTION

According to one aspect, a method includes retrieving multiple images and analyzing each of the retrieved images to identify a set of duplicate images. The method may further include extracting one or more labels assigned to an image of the identified set of duplicate images and associating selected ones of the one or more extracted labels with each image of the identified set of duplicate images.

According to another aspect, a method may include performing image analysis on multiple images and identifying similar images from the multiple images based on the image analysis. The method may further include selectively combining a set of labels assigned to each of the similar images into a superset of labels and assigning at least a portion of the superset of labels to each of the similar images.

According to a further aspect, a data structure encoded on a computer-readable medium may include first data that includes a first set of labels associated with a first digital image and second data that includes a second set of labels associated with a second digital image, where the second digital image is at least similar to the first digital image. The data structure may further include third data comprising a third set of labels that comprises at least a partial union of the first and second sets of labels.

According to yet another aspect, a method may include analyzing each of multiple digital images to identify similar digital images using at least one of histograms, image intensities, edge detectors, or wavelets. The method may further include retrieving labels assigned to the identified similar digital images and selectively concatenating the extracted labels. The method may also include assigning the concatenated labels to each of the identified similar digital images and using the concatenated labels when performing a keyword search of the plurality of digital images.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, one or more digital images, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
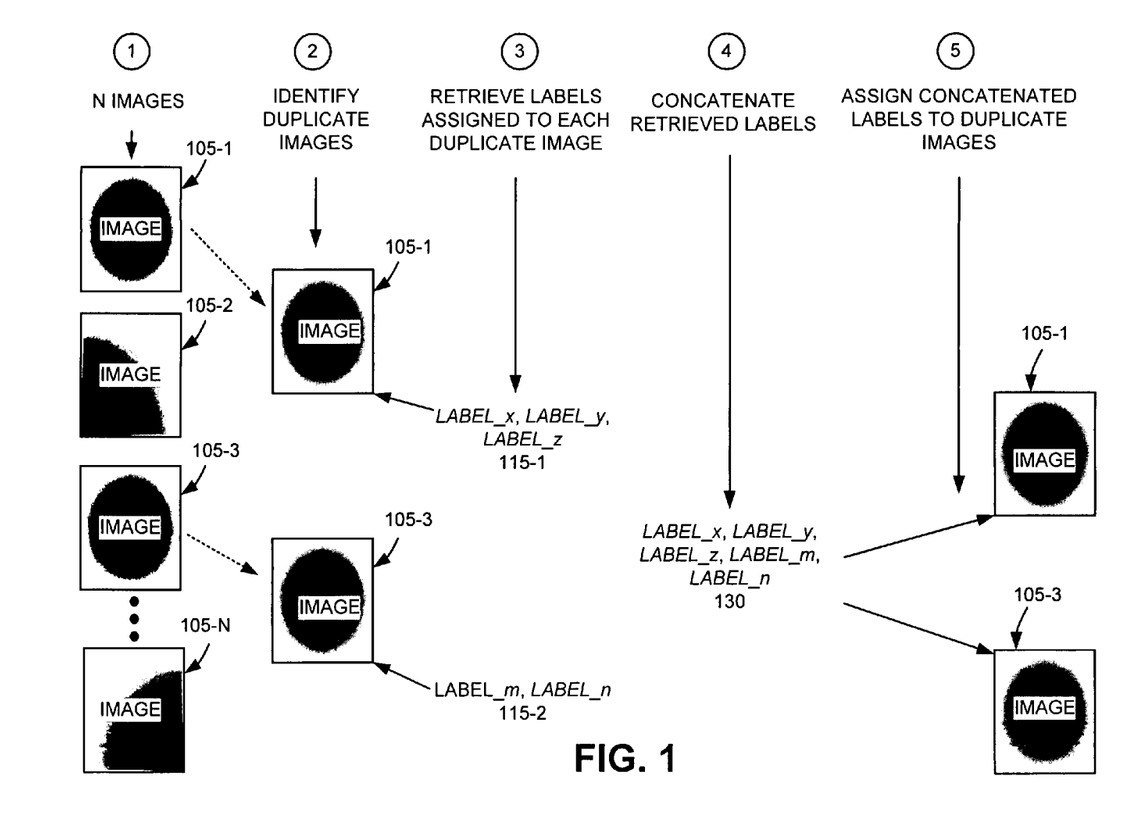
FIG. 1 is a diagram of an overview of an exemplary aspect of the invention.

FIG. 1 illustrates an overview of the use of image duplicates to assign labels to images according to an exemplary aspect of the invention. According to this aspect of the invention, different labels assigned to a set of duplicate images may be used to create a more comprehensive label for each of the image duplicates based on a "superset" of the individual image's labels. The more comprehensive label, thus, expands the keywords associated with each image. This can be used to improve keyword-based image searching.

As shown in FIG. 1, N images 105-1 through 105-N, where N may include any number of images, may be analyzed to identify images of the N images that are duplicate images. Images may be idenfified as "duplicate" images if they are identical, or substantially similar, to one or more other images. Various image analysis techniques, as will be further described below, may be employed to identify images of the N images that are duplicates. As an illustrative example, FIG. 1 depicts images 105-1 and 105-3 being identified as duplicate images.

Labels, assigned to each duplicate image, may be retrieved. Images 105-1 through 105-N typically may have pre-existing labels already assigned to them by conventional algorithms that automatically assign labels to an image by extracting text from the document on which the image is located. The text may include, for example, the filename of the image, anchor text associated with the image, a caption associated with the image, or the document title. As shown in FIG. 1, image 105-1 may have labels LABEL_x LABEL_y and LABEL_z 115-1 assigned to it and image 105-3 may have labels LABEL_m and LABEL_n 115-2 assigned to it.

The labels, assigned to each of the duplicate images, may be concatenated to produce a union of image labels. For example, as shown in FIG. 1, the labels assigned to duplicate images 105-1 and 105-3 have been concatenated to produce a union of labels 130 that includes LABEL_x, LABEL_, LABEL_z, LABEL_m and LABEL_n. The concatenated labels may then be assigned to the duplicate images. As shown in the illustrative example of FIG. 1, the concatenated labels that include LABEL_x, LABEL_Y, LABEL_z, LABEL_m and LABEL_n may be assigned to both of duplicate images 105-1 and 105-3. The concatenated labels may subsequently be used in responding to search queries.

Exemplary Network Configuration

Figure 2:
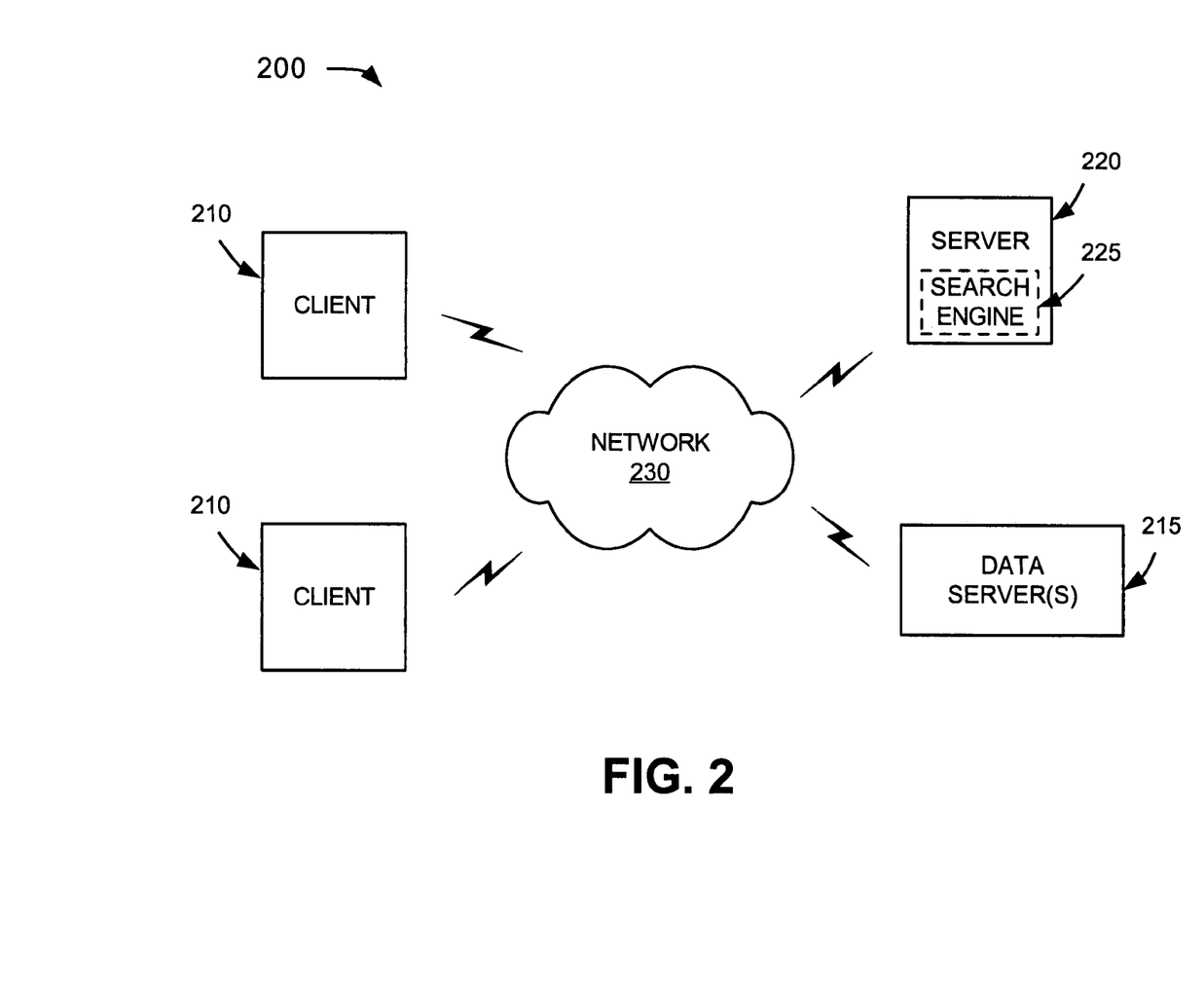
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 215 have been illustrated as connected to network 230 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a query, received from a user, on the corpus of documents hosted on data server(s) 215.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites. Documents stored at server(s) 215 may include digital images that are related, or unrelated, to the other content of the documents.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
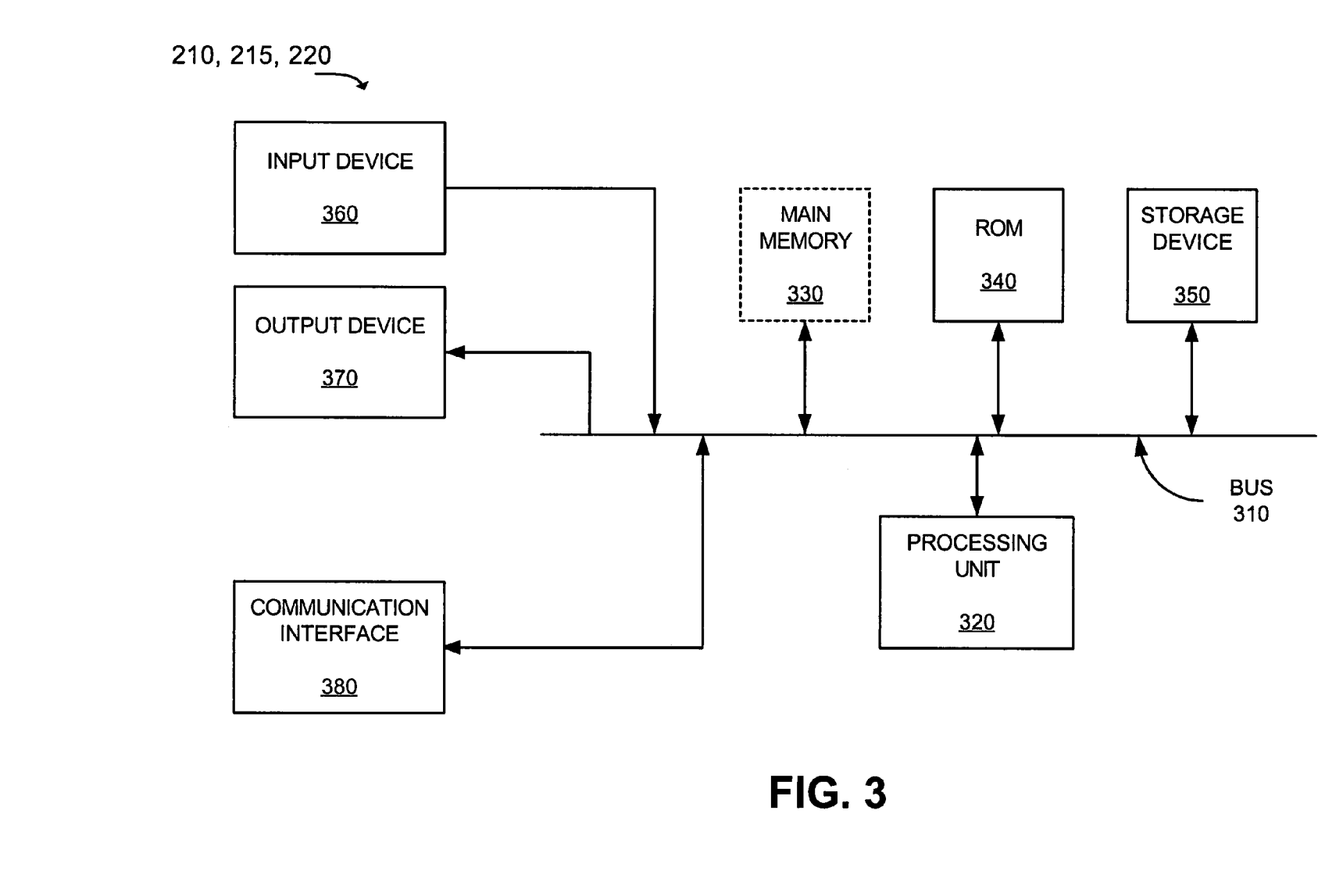
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Duplicate Image Label Assignment Process

Figure 4:
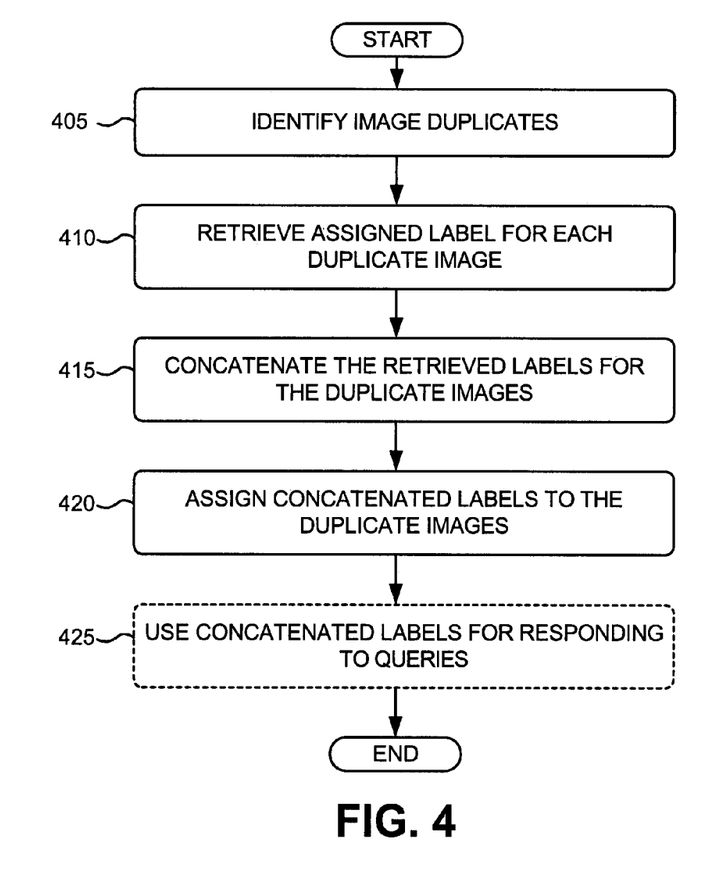
FIG. 4 is a flowchart of an exemplary process for assigning labels to images using duplicate images consistent with principles of the invention.

FIG. 4 is a flowchart of an exemplary process for assigning labels to duplicate images according to an implementation consistent with the principles of the invention. As one skilled in the art will appreciate, the process exemplified by FIG. 4 can be implemented in software and stored on a computer-readable memory, such as main memory 330, ROM 340 or storage device 350 of server 220. In other implementations, the processing exemplified by FIG. 4 can be implemented in hardwired circuitry, such as combinational logic, within processing unit 320 of server 220.

The exemplary process may begin with the identification of duplicate images from a corpus of images (act 405). An image may be identified as a "duplicate" if it is identical, or substantially similar, to another image. Images may be identified as duplicates using any type of image analysis technique. Such image analysis techniques may include, but are not limited to, image analysis using color histograms, image intensities, or edge detectors. One skilled in the art, however, will recognize that other image analysis techniques may, alternatively, be used.

In one exemplary implementation, wavelets may be used to analyze images to identify duplicates, such as the image analysis technique described in "Fast Multiresolution Image Querying," by Charles E. Jacobs, Adam Finkelstein, and David H. Salesin, Computer Graphics (Proceedings of SIGGRAPH), 1995. In this implementation, specific images that are to be compared may be converted to the YIQ color space, and a wavelet transform may be performed on each of the converted images. A predetermined number of highest magnitude wavelet coefficients (e.g., 60) for each image may then be kept (preserving only their signs +1 and −1), with all other coefficients being left at zero. A comparison may then be made that counts how many corresponding wavelet coefficients in the two images have the same value (−1, 0, or +1). Additional contributions to this comparative analysis may include each image's average color and its aspect ratio.

To reduce the storage required for the wavelet coefficients, the wavelet coefficients may be converted to a large bit vector (with 60 bits set to 1) and then the vector may be reduced in size by ORing them together. This results in shorter bit vectors whose number of identical bits may be approximately proportional to the number of matching wavelet coefficients. For N images, N*N/2 comparisons between images' bit vectors might be needed. In this case, image comparison speed may be increased by using techniques such as locality sensitive hashing.

An assigned label for each identified duplicate image may be retrieved (act 410). For example, labels LABEL_1 and LABEL_2, assigned to IMAGE1, may be retrieved, and labels LABEL3 and LABEL4, assigned to IMAGE2, may be retrieved. Each duplicate image may have pre-existing labels already assigned to them by conventional algorithms that automatically assign labels to an image by extracting text, surrounding the image, from the document on which the image is located.

The retrieved labels for the duplicate images may then be concatenated (act 415) or somehow associated together. In one implementation, all of the retrieved labels may be concatenated. Using the previous example, labels LABEL1, LABEL2, LABEL3 and LABEL4 may be concatenated. In other implementations, however, labels of the retrieved labels may be concatenated based on "weights" associated with each respective image. For example, the retrieved labels may be weighted based on the similarity of the images, giving more weight to labels of images that are closer to a designated image.

In yet further implementations, labels assigned to the duplicate images may be selectively concatenated. Each label may be selected based on their frequency of use, or by how common they are in the language. For example, if 10 image duplicates are found, and 8 of them have the label "building" assigned to them, then this is a strong indicator that this label should selected for concatenation over other, less common, labels.

Machine learning/statistical techniques for text corpora summarization may also be used to derive more concise labels for concatenated labels. Thus, a number of labels in a set of labels assigned to duplicate images may be reduced using text corpora summarization techniques.

If simple concatenation of all of the image labels of duplicate images is used, then effectively each of the duplicate images may have the same content and the same set of labels. Therefore, to save space in the index, all but one of these images may be removed at indexing time. Alternatively, all but one of these images may be removed at query time to improve computational efficiency.

The concatenated labels may be assigned to the duplicate images (act 420). For example, concatenated labels LABEL1, LABEL2, LABEL3 and LABEL4 may be assigned to both IMAGE1 and IMAGE2.

Optionally, the concatenated labels may be used for responding to search queries (act 425). When a user at a client 210 performs an image search using search engine 225, the concatenated labels assigned to each of the images may be used, instead of the originally assigned labels. In other implementations, both the originally assigned labels and the concatenated labels may used during an image search. For example, in the same manner that the title field and body fields of documents are typically weighted differently in existing search algorithms, the original and concatenated labels may be weighted differently when performing the image search as well. The concatenated labels may, thus, be used to improve keyword based image searching.

Exemplary Implementation

Figure 5:
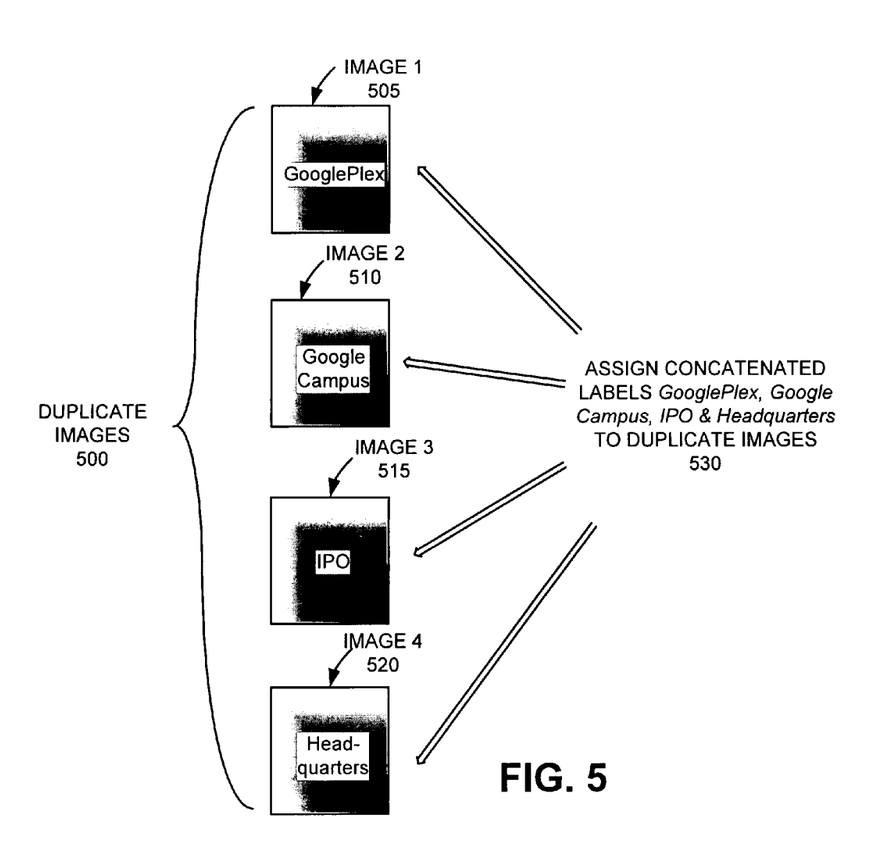
FIG. 5 is a diagram of an exemplary implementation of the invention.

FIG. 5 illustrates an exemplary implementation in which specific duplicate images are identified, and labels assigned to the duplicate images are concatenated. As shown in FIG. 5, duplicate images 500 may be identified from multiple images. Duplicate images 500 may include images 505, 510, 515 and 520, each of which includes an image of the Google Company headquarters. Image 505 may have assigned to it the label "GooglePlex." Image 510 may have assigned to it the label "Google Campus." Image 515 may have assigned to it the label "IPO." Image 520 may have assigned to it the label "headquarters." Each of these labels may be extracted from duplicate images 505, 510, 515 and 520 and concatenated. The concatenated labels "GooglePlex," "Google Campus," "IPO" and "headquarters" may then be assigned 530 to each of duplicate images 505, 510, 515 and 520 for subsequent use in image searching.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 4, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An automated method, comprising:
   retrieving a plurality of images;
   analyzing the retrieved images to identify a set of duplicate images by using at least one of histograms, image intensities, edge detectors, wavelets;
   extracting one or more labels, where at least some of the labels are assigned to an image of the identified set of duplicate images;
   concatenating selected ones of the one or more extracted labels;
   assigning the concatenated labels to at least some of the images of the identified set of duplicate images; and
   storing information regarding the concatenated labels.

2. The method of claim 1, where the duplicate images are at least one of identical or substantially similar.

3. The method of claim 1, where associating
   concatenating the selected ones of the extracted one or more labels comprises:
   concatenating associating all of the extracted labels with each image of the identified set of duplicate images.

4. The method of claim 1, further comprising:
   reducing a number of labels in the concatenated labels using text summarization.

5. The method of claim 1, where concatenating the selected ones of the extracted one or more labels comprises:
   selectively concatenating labels of the extracted labels based on statistical data associated with the labels.

6. The method of claim 5, where the statistical data comprises at least one of frequency of use or commonality of a respective label.

7. The method of claim 1, where concatenating the selected ones of the extracted one or more labels comprises:
   assigning weights to labels of the selected ones of the extracted labels, where higher weights are assigned to the labels of the selected ones of the extracted labels that are assigned to images that are more similar to a designated image of the set of duplicate images.

8. The method of claim 7, where concatenating the selected ones of the extracted one or more labels further comprises:
   selectively concatenating labels of the extracted labels based on the assigned weights.

9. The method of claim 1, further comprising:
   using the concatenated labels when performing a keyword search of the plurality of images.

10. The method of claim 1, further comprising:
    using the concatenated labels and the extracted labels when performing a keyword search of the plurality of stored images.

11. The method of claim 1, further comprising:
    assigning different weights to at least some of the extracted labels and the concatenated labels; and
    using the extracted labels and the concatenated labels when performing a keyword search of the plurality of images based on the assigned weights.

12. An automated method, comprising:
    performing image analysis on a plurality of images, where at least some of the images are associated with data comprising a set of labels;
    identifying similar images from the plurality of images based on the image analysis;
    selectively combining at least some of the labels associated with at least some of the similar images into a superset of labels by forming a partial union of the at least some of the labels associated with at least some of the similar images;

assigning at least a portion of the superset of labels to at least some of the similar images;

storing information regarding the at least a portion of the superset of labels; and using the assigned at least a portion of the superset of labels when performing a keyword search of the plurality of images.

13. The method of claim 12, where performing image analysis comprises:

using at least one of histograms, image intensities, edge detectors or wavelets to perform image analysis.

14. The method of claim 12, where selectively combining comprises:

combining every set of labels associated with each of the similar images into the superset of labels.

15. The method of claim 12, where selectively combining comprises:

selectively combining at least some of the labels from at least some of the set of labels into the superset of labels based on statistical data associated with at least some of the labels.

16. The method of claim 15, where the statistical data comprises at least one of frequency of use or commonality of a respective label.

17. The method of claim 12, where selectively combining comprises:

assigning weights to labels from at least some of the sets of labels, where higher weights are assigned to labels from at least some the sets of labels that are assigned to images that are more similar to a specific image of the similar images.

18. The method of claim 17, where selectively combining further comprises:

selectively combining at least some of the labels from at least some of the sets of labels into the superset of labels based on the assigned weights.

19. The method of claim 12, further comprising:

reducing a number of labels in the superset of labels using text summarization.

20. The method of claim 12, further comprising:

using at least some of the labels of each set of labels and the at least a portion of the superset of labels when performing a keyword search of the plurality of images.

21. The method of claim 12, further comprising:

assigning different weights to some labels of each set of labels and to some labels of the superset of labels; and using the labels of each set of labels and each label of the superset of labels based on the assigned weights.

22. A computer-readable memory device containing instructions for controlling at least one processor to perform a method, the method comprising:

analyzing images of a plurality of digital images, where each digital image is associated with data comprising a set of labels;

identifying similar images from the plurality of digital images based on the image analysis;

selectively combining at least some of the labels associated with at least some of the similar images into a superset of labels by forming at least a partial union of the at least some of the labels associated with at least some of the similar images;

assigning at least a portion of the superset of labels to each of the similar images;

storing information regarding the at least a portion of the superset of labels, and using the assigned at least a portion of the superset of labels when performing a keyword search of the plurality of images.

23. The computer readable memory device of claim 22, where the superset of labels comprises a complete union of the labels associated with each of the similar images.

24. The computer-readable memory device of claim 22, further comprising:

weights assigned to at least some of the labels of the set of labels, where the at least a partial union of the at least some of the labels associated with at least some of the similar images comprises labels that have specified weights.

25. The computer-readable memory device of claim 24, where the specified weights are based on the degree of similarity between particular digital images of the similar images.

26. A system implemented in a computer device, comprising:

means for analyzing a plurality of images where at least some of the images are associated with data comprising a set of labels;

means for identifying duplicate images from the plurality of images based on the image analysis;

means for combining at least some of the labels associated with at least some of the duplicate images into a superset of labels by forming a partial union of at least some of the labels associated with at least some of the duplicate images;

means for assigning at least a portion of the superset of labels at least some of the duplicate images;

means for storing the at least a portion of the superset of labels. And means for using the assigned at least a portion of the superset of labels when performing a keyword search of the plurality of images.

27. The system of claim 26, where at least some of the images are associated with data comprising a set of labels by extracting text associated with a document in which the image is located.

28. The system of claim 27, where the text is at least one of a filename, anchor text, a caption, or a document title.

29. The system of claim 26, where the image analysis is performed with at least one of histograms, image intensities, edge detectors, or wavelets.

30. An automated method, comprising:

analyzing at least some of a plurality of digital images to identify similar digital images using at least one of histograms, image intensities, edge detectors, or wavelets;

retrieving labels assigned to the identified similar digital images;

selectively concatenating the extracted labels;

assigning the concatenated labels to each of the identified similar digital images; and using the concatenated labels when performing a keyword search of the plurality of digital images.

31. The method of claim 30, where performing a keyword search comprises assigning different weights to at least some of the concatenating labels and to at least some of the extracted labels.

32. The method of claim 30, where selectively concatenating the labels comprises concatenating the labels based at least in part on one of a frequency of use of at least some of the labels or on how commonly each label appears in a language.

33. The method of claim 30, where selectively concatenating the labels comprises concatenating the labels based at least in part on weights assigned to the identified similar digital images.

* * * * *